Feb. 13, 1962 M. M. LANDE 3,020,728
APPARATUS FOR MAKING AND STORING A FROZEN CONFECTION
Filed Aug. 31, 1959
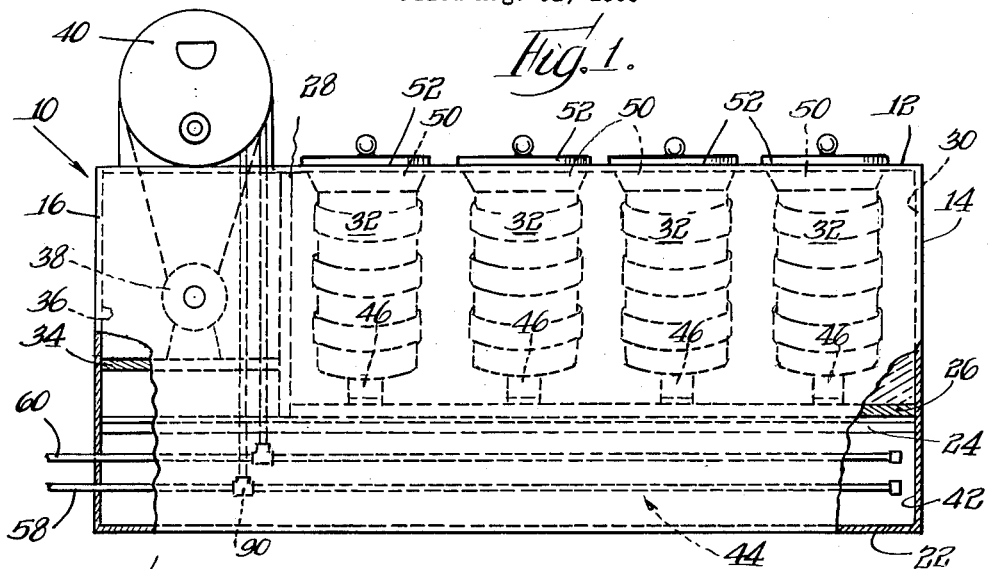
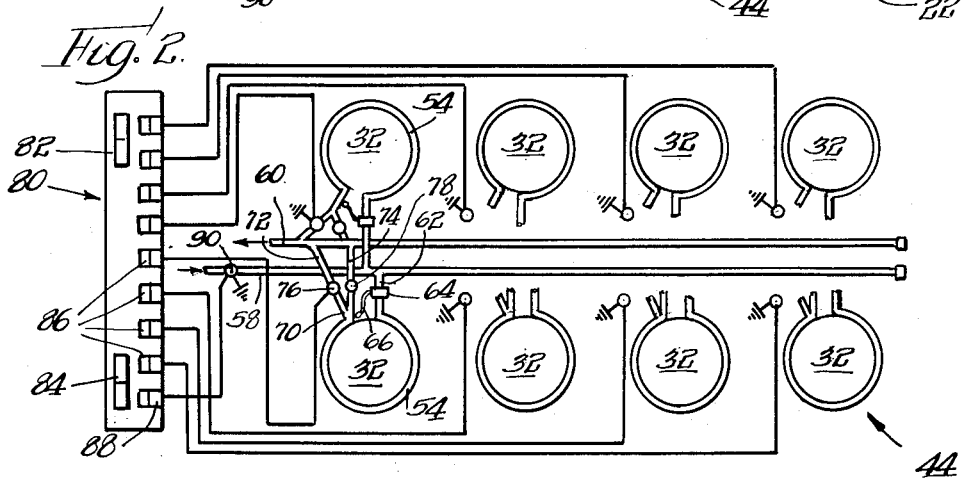
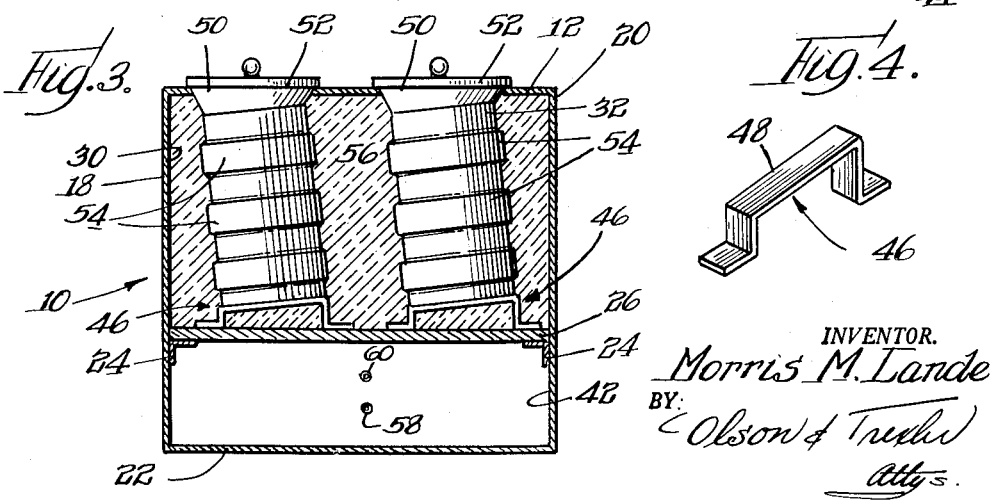
INVENTOR.
Morris M. Lande
BY
Olson & Trexler
Attys.

United States Patent Office 3,020,728
Patented Feb. 13, 1962

3,020,728
APPARATUS FOR MAKING AND STORING
A FROZEN CONFECTION
Morris M. Lande, 601 W. 110th St., New York, N.Y.
Filed Aug. 31, 1959, Ser. No. 837,183
2 Claims. (Cl. 62—199)

This invention relates generally to apparatus for processing a frozen confection such as ice cream and more particularly to an apparatus for batchwise producing and storing a frozen confection.

This application is a continuation-in-part of my co-pending application, Serial No. 634,561, filed January 16, 1957.

According to conventional practice, retailers of bulk ice cream receive this product in large containers from an ice cream manufacturer. Customarily, some of these containers of ice cream are stored in a refrigerated cabinet for later use while others are held for immediate use in a dispensing cabinet. The dispensing cabinet is ordinarily refrigerated to a temperature somewhat above that maintained in the storage cabinet and is frequently incorporated as part of a serving counter.

This general scheme, of course, makes the retailer entirely dependent upon the manufacturer for his supply of ice cream; and during periods of unusually high demand, the retailer is frequently unable to maintain his supply of all or of certain flavors of the ice cream. If the retailer is to establish adequate stocks for these unusual demand situations, he must install expensive refrigerated storage facilities and he must inventory appreciable stocks of the several flavors. It has been found that pursuit of such an operation prohibitively increases the cost of ice cream.

Certain apparatus has heretofore been available for use by an individual retailer enabling him to make and store batches of his own ice cream; but these apparatus have generally been inconvenient and uneconomical to operate. Consequently, most retailers of bulk ice cream continue to rely on a manufacturer.

Therefore, an important object of the present invention is to provide improved apparatus for batchwise producing and storing a frozen confection.

Another object of the invention is to provide such apparatus that permits a retailer of bulk ice cream to control his supply of that product according to his needs and wishes.

Yet another object of the invention is to provide an apparatus for producing and storing a frozen confection in which a number of containers full of soft frozen ice cream can be finished and stored at the proper respective temperatures in the same container-receiving receptacle.

A further object of the invention is to provide apparatus for batchwise producing and storing a frozen confection which apparatus avoids the need of auxiliary refrigerated storage equipment.

A still further object of the invention is to provide apparatus of the above described type in which certain batches of ice cream can be held dispensable while others are being produced so as to insure a continuous supply.

And a still further object of the invention is to provide apparatus of the type described which is simply constructed and both convenient and economical to operate.

Additional objects and features of the invention pertain to the particular structure and arrangements whereby the above objects are attained.

The structure in accordance with the invention includes a cabinet which houses apparatus for mixing and freezing a frozen confection; a number of independently operable, refrigerated, forwardly tilted, container-receiving receptacles; and a refrigeration system that is arranged controllably to refrigerate each of the container-receiving receptacles to an independently selected low temperature.

The invention, both to its structure and mode of operation, will be better understood by reference to the following disclosure and drawing forming a part thereof, wherein:

FIG. 1 is a front elevational view, partially in invisible outline, of apparatus in accordance with the invention;

FIG. 2 is a schematic diagram of a refrigeration circuit and accompanying controls, which circuit may be used in the apparatus shown in FIG. 1;

FIG. 3 is a side elevational view in cross section of the apparatus of FIG. 1; and FIG. 4 is a perspective view of a mounting bracket which may be used in supporting the container-receiving receptacles used in the apparatus of FIG. 1.

Referring now in detail to the drawing, specifically to FIGS. 1 and 3, a cabinet 10 is shown to include a top 12, sidewalls 14 and 16, a front 18, a back 20 and a floor 22. A pair of angled beams 24 extend longitudinally through cabinet 10, being secured to the front 18 and the back 20 in order to support a shelf 26.

Shelf 26 confronts an internal wall 28 so as to define a compartment 30 which houses a suitable number of open top, ice cream container-receiving receptacles 32. While the receptacles 32 are shown to be cylindrical, they may take other shapes, such as square, the ice cream containers being configurated correspondingly.

The internal wall 28 also confronts a shelf 34 that extends inwardly from wall 16 so as to define a chamber 36. Chamber 36 houses a drive motor 38 which supplies motive force to a mixing-and-freezing type ice cream making device 40. It will be understood that device 40 may be equally well arranged separately adjacent to cabinet 10.

Shelves 26 and 34 and wall 28 also serve to define a compartment 42 which encloses a refrigeration system 44.

The receptacles 32 are mounted vertically in compartment 30 by means of brackets 46 which are affixed to the shelf 26. Each of the brackets 46 has a forwardly downwardly sloping top surface 48 which is adapted to support a receptacle 32 in a forwardly tilted position, as is best shown in FIG. 3. This forward tilting arrangement of the receptacles 32 greatly facilitates hand spooning of ice cream from a container residing in the receptacle and permits direct thermal contact of the forward portion of the container with the receptacle.

The outwardly flaring top rim 50 of each receptacle 32 is appropriately beveled so that covers 52 will rest flush with the top 12 of cabinet 10.

As is best shown in FIG. 3, a number of refrigerant flow channels 54 surround each of the receptacles 32. As will be recognized, channels 54 may be arranged over any part of the periphery of receptacles 32. The receptacles 32 are further adapted to receive ice cream-containing containers in a slidably close-fitting manner so that a minimum air space may exist between the container and the receptacle wall. More rapid and more efficient heat transfer is thereby achieved.

It has proved advantageous to insulate the receptacles 32. Accordingly, a quantity of a suitable insulating material 56, preferably a foamed-in-place resin, is provided to fill the compartment 30. Alternatively, each receptacle may be enclosed in a shell of suitably thick insulation material.

Turning now to FIG. 2 for a more detailed description of the refrigeration system 44, an inlet line 58 and a vacuum line 60 communicate with the compressor of a conventional refrigeration device, not shown. If desired, the compressor and other components of the refrigeration device may be mounted within the compartment 42. Inlet line 58 and vacuum line 60 extend through compartment 42 to communicate with the flow channels 54 of each of the receptacles 32, connecting the several receptacles in a parallel refrigeration circuit.

Inlet line 58 communicates with the channels 54 of a receptacle 32 by means of a conduit 62. A thermostatic expansion valve 64 is connected in conduit 62 so as to have its expansible vapor-type sensing bulb 66 mounted in thermal contact with an outlet conduit 70. Conduit 70 leads from channels 54 to vacuum line 60.

Advantageously, conduit 70 branches to form conduits 72 and 74 which have connected respectively therein a normally closed, solenoid control valve 76 and a back pressure regulating valve 78.

As will become apparent, the flow of cold refrigerant in conduit 62 is regulated by the thermostatic expansion valve 64 according to the temperature which sensing bulb 66 recognizes at conduit 70. Advantageously, valve 64 is arranged to allow the proper amount of refrigerant to flow into the channels 54 in compliance with the demands established by means of valves 76 and 78.

Since valve 76 is normally closed, back pressure regulating valve 78 is normally arranged to maintain a relatively low vacuum in flow channels 54. When valve 76 is opened, however and due to the greater vacuum being maintained in line 60, the increased vacuum in line 74 caused by the partial bypass achieved through valve 76 affects an automatic closing of valve 78. As a result, flow channels 54 are maintained at an increased vacuum and consequently at an increased refrigeration rate, thereby achieving a lower temperature within the receptacles 32 and at conduit 70.

The refrigeration system 44 is ordinarily regulated to maintain a temperature of approximately plus 10 degrees Fahrenheit when valve 76 is closed and a temperature of approximately minus 20 degrees Fahrenheit when valve 76 is open.

Continuing with reference to FIG. 2, there is shown an electrical control panel 80 which may be suitably mounted to cabinet 10. Panel 80 includes a main power switch 82 for connecting the panel 80 with a suitable source of electrical energy, not shown. As will be recognized, switch 82 may be also adapted to energize the compressor of the refrigeration device associated with the refrigeration system 44.

Panel 80 additionally incorporates a power switch 84 for energizing motor 38 and a number of control switches 86 for operating the individual solenoid valves 76. Furthermore, a control switch 88 may be included in the panel 80 for operating a solenoid valve 90 whereby refrigerant may be passed to the mixing device 40. It is to be understood that a timing device can be incorporated in the control panel 80, if desired, to operate each of the valves 76 selectively for a predetermined interval. Such a timing device may be employed to time automatically the lower temperature or finishing operation in the receptacles 32.

Having thus described one construction of the invention, it is important now to state how the illustrated embodiment operates. Having power applied to control panel 80 and refrigerant flowing through the lines 58 and 60 and having ice cream in its pliably dispensable state filling the several receptacles 32, the solenoid valves 76 will be in their normally closed positions and the reduced vacuum will be applied to the flow channels 54. Accordingly, the receptacles 32 will be operated at the relatively higher or dispensing temperature.

As the ice cream is used up in any given receptacle, a new batch of ice cream may be made by pouring the proper ingredients into the mixing device 40 and subsequently energizing motor 38 through switch 84. Simultaneously, switch 88 may be operated to open valve 90 allowing refrigerant to flow through the mixing device 40. After a suitable period of time has elapsed and the new batch of ice cream is properly mixed, expanded and soft frozen, the batch may be poured into a suitable container which may then be placed in the vacant receptacle 32. Switches 84 and 88 may then be appropriately turned off.

The switch 86 that is associated with the receptacle 32 which has had placed within it the new batch of ice cream will next be operated to open the corresponding solenoid valve 76. In response to the diversion of refrigerant flow occasioned thereby, the corresponding back pressure regulating valve 78 will close increasing the vacuum on flow channels 54. Accordingly, the lower or finishing temperature will be established in the receptacle 32.

When the ice cream has been processed to its finished, pliably dispensable state, the appropriate switch 86 may then be operated to close valve 76 allowing the receptacle 32 to resume operation at the relatively higher or dispensing temperature.

As will be apparent, this cycle may be repeated indefinitely for any one of the receptacles 32; and it will become further apparent that each of the receptacles 32 may be independently operated in this manner.

The specific example herein shown and described is illustrative only. Various changes in structure will, no doubt, occur to those skilled in the art; and these changes are to be understood as forming a part of this invention insofar as they fall within the spirit and scope of the appended claims.

The invention is claimed as follows:

1. Apparatus for producing and storing a frozen confection comprising: cabinet means; a plurality of vertically disposed container-receiving means secured within said cabinet means, each of said container-receiving means being laterally encircled by refrigerant flow-channels; refrigeration means disposed within said cabinet means, including refrigerant inlet and vacuum lines communicating with the flow channels in each of said container-receiving means to connect said container-receiving means in a parallel refrigeration circuit, said vacuum line including a main line and a plurality of forked branch lines, each of said forked branch lines including a conduit associated with relatively high rates of refrigerant flow and a conduit associated with relatively low rates of refrigerant flow, each of said branch lines connecting the refrigerant flow channels of one of said container-receiving means to said main line; and control means for regulating the flow of refrigerant in said refrigeration means and in said flow channels to establish and maintain a selected, low temperature within each of said container-receiving means, said control means including valve means in each conduit of each of said branch lines, the valve means in said high rate line being normally closed for maintaining the corresponding receiving means at a relatively high, dispensing temperature and the valve means in said low rate line being responsive to opening of said first mentioned valve means for establishing and maintaining a relatively low temperature in said corresponding receiving means, said control means further including inlet valves in said refrigerant inlet line individually associated with each of said container-receiving means, each of said inlet valves being slaved to the temperature in the corresponding branch line upstream of said fork whereby to regulate the refrigerant flow to the respective container-receiving means.

2. Apparatus for producing and storing ice cream comprising: cabinet means including a first and a second compartment; a plurality of independently operable, vertically disposed receptacles secured in spaced-apart relationship within said first compartment, each of said receptacles being laterally encircled by refrigerant flow channels; refrigeration means disposed within said second compartment, including refrigerant inlet and vacuum lines communicating with the flow channels in each of said receptacles to connect said receptacles in a parallel refrigeration circuit, said vacuum line including a main line and a plurality of forked branch lines, each of said forked branch lines including a conduit associated with relatively high rates of refrigerant flow and a conduit associated with relatively low rates of refrigerant flow, each of said branch lines connecting the refrigerant flow channels of one said receptacles to said main line; control means for regulating the flow of refrigerant in said refrigeration means and in said flow channels to establish and maintain a selected, low temperature within each of said receptacles, said control means including valve means in each conduit of each of said branch lines, the valve means in said high rate line being selectively operable and normally closed for maintaining the corresponding receptacle at a relatively high, dispensing temperature, the valve means in said low rate line being a back pressure valve responsive to opening of said first mentioned valve means for establishing and maintaining a relatively low temperature in said corresponding receptacle, said control means further including inlet valves in said refrigerant inlet line individually associated with each of said receptacles, each of said inlet valves being slaved to the temperature in the corresponding branch line upstream of said fork whereby to regulate refrigerant flow to the respective receptacle; and thermal insulation in said first compartment intimately surrounding each of said receptacles.

References Cited in the file of this patent

UNITED STATES PATENTS

| | | |
|---|---|---|
| 1,050,894 | Williams | Jan. 21, 1913 |
| 2,075,838 | Torrey | Apr. 6, 1937 |
| 2,088,840 | Copeman | Aug. 3, 1937 |
| 2,233,975 | Epperson | Mar. 4, 1941 |
| 2,328,810 | Johnson | Sept. 7, 1943 |
| 2,531,323 | Connell | Nov. 21, 1950 |